Dec. 3, 1963   G. J. BENES   3,112,555
TOOL SUPPORT
Filed Feb. 2, 1961   3 Sheets-Sheet 1
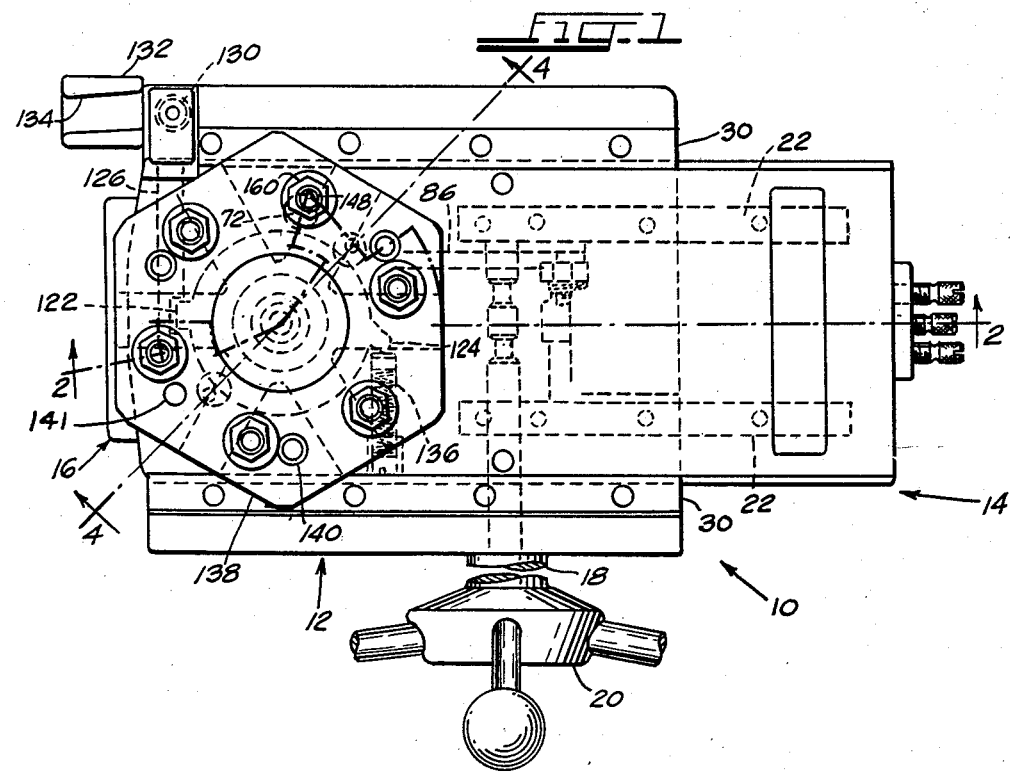
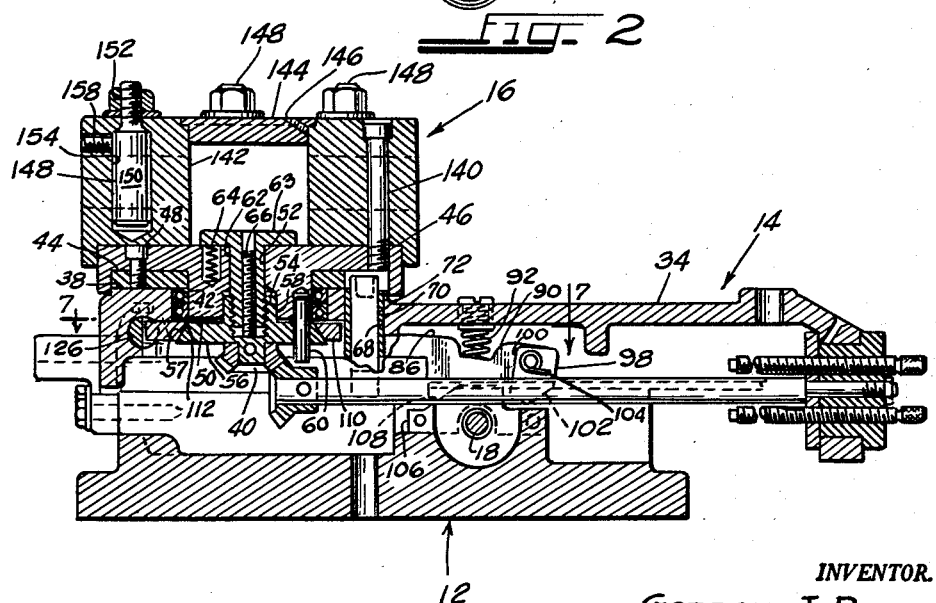
INVENTOR.
GORDON J. BENES
BY
*Silverman, Mullin & Cass*
ATTYS.

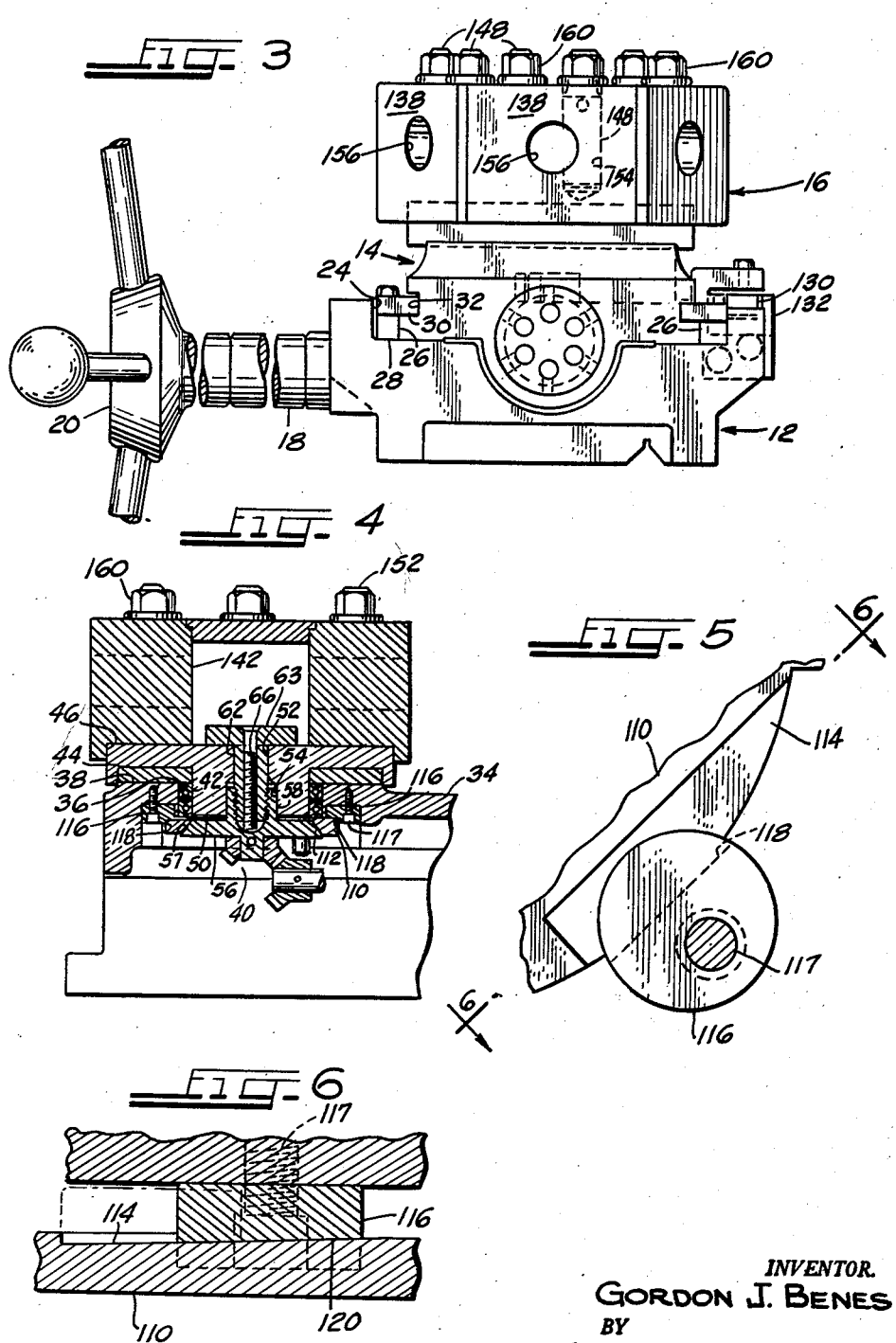

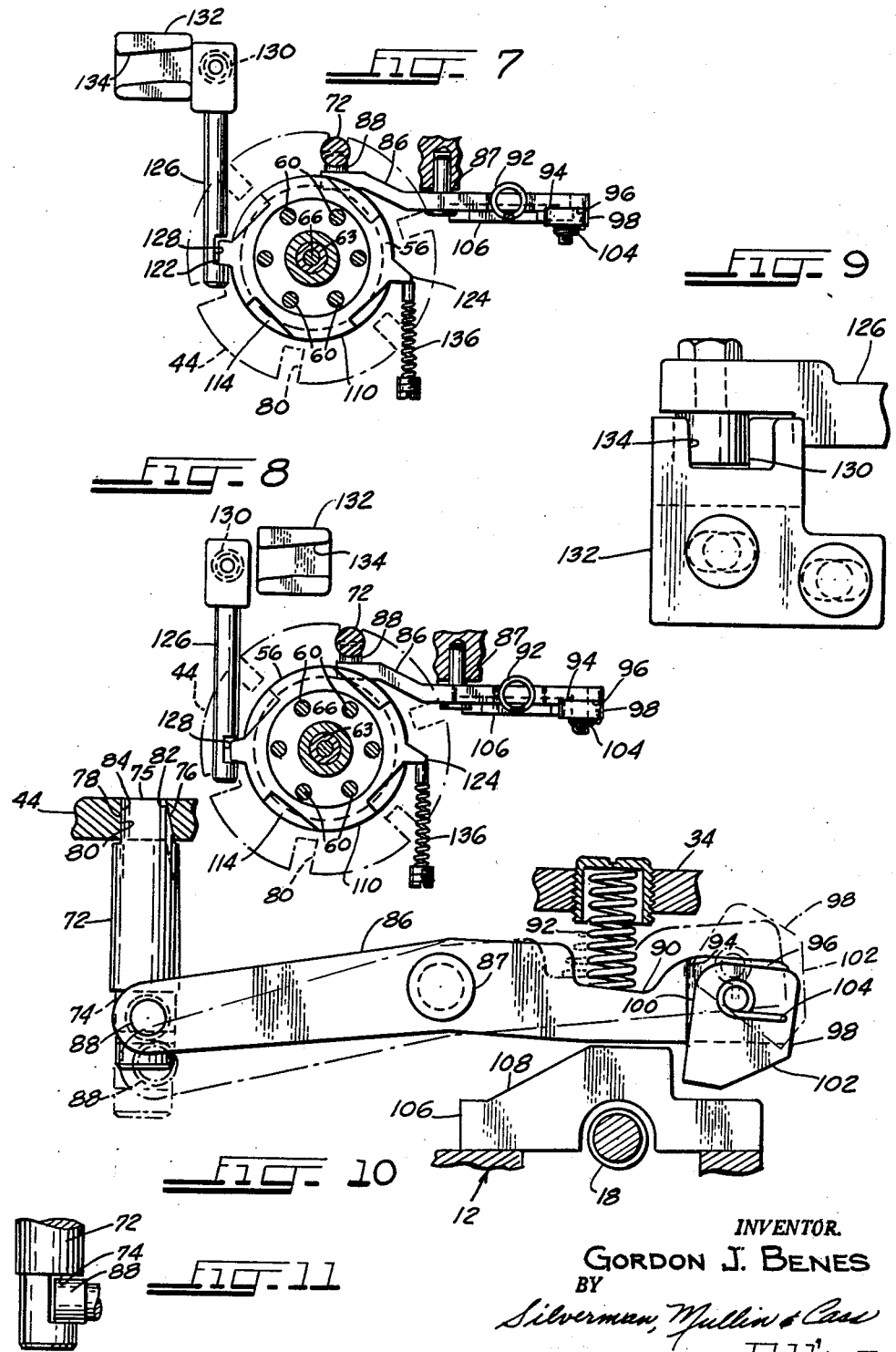

United States Patent Office 3,112,555
Patented Dec. 3, 1963

3,112,555
TOOL SUPPORT
Gordon J. Benes, Riverside, Ill., assignor to Enco Manufacturing Co., Chicago, Ill., a corporation of Illinois
Filed Feb. 2, 1961, Ser. No. 86,748
12 Claims. (Cl. 29—39)

This invention relates generally to turret-type tool supports for use on lathes and like machines and more particularly to improved tool supports embodying numerous improvements which render the same universally adaptable, more accurately efficient, less costly and simpler to operate.

In general, tool supports of the type under consideration heretofore comprised some form of base and massive slide which were adjustably connectable to the bed of a lathe or like machine. Integrally formed with, or otherwise permanently connected to, the front end of the slide was a turret-type support (generally hexagonal or round) for supporting a plurality of tools. The turret was rotatable so that any of the tools supported thereby could be selectively indexed into operational position. Means were provided for longitudinally moving the slide to bring the tool turret and supported tools into operational position. Means were likewise provided for locking the tool turret into the selected indexed position during the work cycle. The entire tool support was of course a highly precision made device and thus comprised an expensive piece of equipment.

It is well known that in precision metal working extremely close tolerances (sometimes a few thousandths of an inch) are often required. Hence, the primary function of the described tool supports is to hold a tool in exact alignment so that the particular work operation may be carried out with the utmost precision. The chief problems encountered in this field thus relate to the means for insuring the true and exact alignment of the aforementioned parts. Since it is likewise well known that no two lathes are exactly alike in critical dimensions even though they may be of the same size and make, it is therefore necessary to accurately bore out a tool support to exactly suit the particular machine on which the same is to be used. Once a tool support has thus been bored out it was heretofore virtually impossible to use the same on a second similar machine. This was of course particularly true in cases where the tool turret was permanently affixed to the slide components of the tool support. The obvious consequence was the necessity of using an entirely separate and expensive tool support for each and every machine being operated.

It is therefore an important object of this invention to provide a turret-type tool support which may be readily transferred and used interchangeably on more than one lathe or like machine.

Another important object of the invention is to afford a tool support of the character described in which the tool turret comprises a relatively inexpensive part which may be readily connected to, or disconnected from, the tool support slide. A plurality of such turrets may thus be individually bored out to suit the particular machine on which the same is to be used and then may be employed interchangeably with a single base and slide structure.

A related object is to afford a tool support of the character described in which a bored turret with tools supported therein may become a fixture for a particular job, said tools remaining accurately pre-set in the turret for the next cycle or run of the job.

While attempts may have been made in the past to cope with the described problems of interchangeability, such attempts were characterized by self-defeating disadvantages. In general, all of the precision indexing means and the locating bearings and bushings by means of which the turret was accurately connected to the slide comprised an integral part of the turret itself. Thus, even in cases where the turret was made removable, the necessity of replacing or interchanging such an expensive part afforded very little advantage at best. In addition, it was often discovered that even these expensive turrets did not always uniformly and accurately mate with a single slide.

It is therefore another important object of the invention to afford a tool support of the character described in which the indexing means and the essential locating bearings and bushings comprise an integral part of the slide itself. Thus, a plurality of inexpensive turrets may be used with uniformly assured accuracy on a single slide.

A further object is to provide a tool support of the character described having novel automatic means for locking the tool turret into the selected indexed position. Accordingly, said means are automatically operable upon longitudinal movement of the slide into operational position. Similarly, the longitudinal movement of the slide away from operational position after completion of the particular work cycle results in said means automatically unlocking the turret so that the turret may be readily removed or rotated into the next position desired. The invention thus eliminates all manually operable locking and unlocking means of the type which were heretofore found necessary.

Still another object is to afford a tool support of the character described having tool shank locking studs which are sized and positioned in the turret so that the turret may be bored out with tool holes of varying standard sizes. Thus, the described inexpensive turret is standardized and may be used to accommodate all tools with customary sized shanks.

Yet another object is to provide a tool support of the character described wherein the inevitable wear of the slide bearing ways may be readily compensated for by the mere insertion of a properly sized shim or the like between the removable turret and the locating and bearing members of the slide. The useful life of the entire support may thus be greatly prolonged.

Still a further object is to afford a tool support of the character described which is highly accurate, efficient and simple to operate, and yet is relatively inexpensive to manufacture and maintain.

With the foregoing and other objects in view which will appear as the description proceeds, the invention consists of certain novel features of construction, arrangement and a combination of parts hereinafter fully described, illustrated in the accompanying drawings, and particularly pointed out in the appended claims, it being understood that various changes in the form, proportion, size and minor details of the structure may be made without departing from the spirit or sacrificing any of the advantages of the invention.

For the purpose of facilitating an understanding of my invention, I have illustrated in the accompanying drawings a preferred embodiment thereof, from an inspection of which, when considered in connection with the following description, my invention, its mode of construction, assembly and operation, and many of its advantages should be readily understood and appreciated.

Referring to the drawings in which the same characters of reference are employed to indicate corresponding or similar parts throughout the several figures of the drawing:

FIG. 1 is a top plan view of a tool support embodying the principles of the invention;

FIG. 2 is a vertical sectional view taken substantially on the plane of irregular line 2—2 in FIG. 1 and viewed in the direction indicated;

FIG. 3 is a rear end elevational view of the tool support;

FIG. 4 is a fragmentary vertical sectional view taken on the plane of line 4—4 in FIG. 1 and viewed in the direction indicated;

FIG. 5 is an enlarged fragmentary detail view of a portion of the cam locking ring and a cooperating cam block comprising a portion of the locking means;

FIG. 6 is a fragmentary sectional view taken on the plane of line 6—6 in FIG. 5 and viewed in the direction indicated;

FIG. 7 is an assembly view, partially in section, taken on the plane of line 7—7 in FIG. 2 and viewed in the direction indicated, with the indexing plate positioned above said plane being shown in dotted outline, and illustrating the unlocked condition of the tool support;

FIG. 8 is a similar view with the tool support in the locked condition;

FIG. 9 is an enlarged fragmentary detail view showing the cooperation between the cam bracket, cam follower and actuator pin of the locking means;

FIG. 10 is an enlarged fragmentary assembly view illustrating the cooperation between the various elements of the tool support's indexing means; and FIG. 11 is a similar view showing certain details of construction of the indexing pin.

Referring now to FIG. 1 of the drawings, it will be seen that the numeral 10 indicates generally a tool support embodying the principles of the invention. The tool support 10 comprises generally a base 12, a slide 14 and a removable tool turret 16. The base may of course be immovably attached by any suitable means (not shown) to a lathe or like machine upon which the tool support 10 is to be used.

In general, the base 12 and the means for longitudinal movement of the slide 14 thereon are of similar construction to that disclosed in my prior Patent No. 2,481,712. There is thus journalled in the base 12 a shaft 18 which terminates in a suitable hand-control or pilot wheel 20. Mounted on the shaft 18 may be a pair of spaced spur pinions (not shown) said pinions adapted to intermesh and cooperate with a pair of toothed racks 22 secured to the underside of the slide 14. Similarly, the base 12 is longitudinally channelled as at 24 (see FIG. 3). Secured to the base 12 and lining the walls of the channel 24 thereof is a pair of square type gibs 26, each of said gibs comprising a pair of elongated rectangular bars such as 28 and 30. The lateral sides of the slide 14 are provided with horizontal channels 32 which cooperate with the gibs 26 to provide a gib-way therefor, as indicated in FIG. 3 of the drawings. I prefer to employ the square type gibs 26 illustrated because I have found that manufacturing costs may be reduced considerably by eliminating the hand scraping heretofore necessary with the customary dovetail ways. The gibs 26 may of course be adjustably mounted by any suitable means (not shown) to permit the accurate setting thereof.

Turning now to FIGS. 2 and 4, it will be seen that the slide 14 comprises a substantially flat horizontal member with a top wall 34 having a circular opening 36 formed near the front end thereof and an annular collar 38 encircling the marginal edges of said opening. A generally annular cavity 40 is formed in the front end of the side 14 in communication with the opening 36. Positioned on said collar 38 and within said opening 36 and cavity 40 are the novel indexing, bearing and locking means which will now be described in detail.

An annular radial ball bearing 42 is nicely fitted within the opening 36. Positioned on the collar 38 is an annular turret indexing plate 44 whose function will be subsequently described. Mounted on the indexing plate 44 is a circular turret master plate 46, and these two members are fixedly connected together by suitable means such as a plurality of screws 48. The master plate 46 is formed with a depending hub 50 which fits snugly within the ball bearing 42. It will thus be appreciated that the indexing plate 44 and master plate 46 are rotatably mounted as a unit in the slide 14. The master plate 46 is formed with a central aperture 52 opening to the top of the hub 50 and an integrally formed enlarged diameter aperture portion 54 opening to the bottom of said hub.

Connected to the master plate 46 and positioned in the cavity 40 is a circular turret locking plate 56. It is important to note that the circumferential edge 57 of the locking plate 56 is inclined downwardly and outwardly for reasons which will become apparent as the description proceeds. The locking plate is formed with an internally threaded upstanding hub 58, and as indicated in FIGS. 2 and 4 of the drawings, the hub 58 is dimensioned to fit snugly up into the enlarged diameter aperture portion 54 of the master plate hub 50. A plurality of dowel pins 60 (six, in the embodiment illustrated) are positioned through pairs of aligned holes formed in the hub 50 and locking plate 56, as indicated. It will thus be appreciated that the locking plate 56 and master plate 46 are keyed together so that these two members and the indexing plate 44 are adapted to be rotated as a single unit.

A tension-adjusting screw 62 having an enlarged head 63 may be positioned through the aperture 52 and is engaged within the upstanding hub 58 of the locking plate 56. A plurality of tension springs 64 are positioned in suitable holes formed in the master plate 46, and said springs normally expand upwardly against the bottom surface of the head 63 of the screw 62 as indicated in FIG. 2. The screw 62 thus acts not only to connect together the aforementioned various plate assemblies, but also affords a means for adjusting the tension on the automatic locking means which will be subsequently described. The adjusting screw 62 is provided with an internally threaded central bore in which is engaged a locking screw 66 for locking the entire plate assembly into the selected condition of tension.

The indexing means whereby the master plate 46 (and the subsequently to be described detachable turret 16) may be indexed into any desired position may now be described. Referring specifically to FIGS. 2, 7, 8 and 10, it will be seen that a vertical bore 68 is formed in the wall of the slide cavity 40. An elongated sleeve 70 is immovably mounted in the bore 68, and an indexing pin 72 is snugly but reciprocably positioned in the sleeve 70. The indexing pin 72 is provided with a recess or notch 74 adjacent the bottom thereof (see FIG. 11). The top of the indexing pin 72 comprises a tip 75 having a tapered face 76 and a substantially vertical face 78. The indexing plate 44 is formed with a plurality of notches 80, each of said notches having a tapered surface 82 and a substantially vertical surface 84 of complementary configuration with the tip 75 of the indexing pin 72. It will thus be appreciated that each of the notches 80 is adapted to accurately receive the tip 75 of the indexing pin 72. In all of the figures illustrated, the indexing pin 72 is thus positioned so that the master plate 46 may not now be rotated or further indexed.

In order to reciprocate the indexing pin 72 out of the condition illustrated to permit further indexing, I have provided a lever 86 which is pivotally mounted at the center 87 thereof in the slide 14. An activating button 88 is riveted or otherwise permanently connected to an end of the lever 86, and said button is positioned within the notch 74 of the indexing pin 72. A positioning detent 90 is formed in the lever 86 between the center 87 and the opposite end thereof. A coil spring 92 is positioned between the slide top wall 34 and said detent 90 and is adapted to normally urge this end of the lever 86 downwardly. The action of the spring 92 thus tends to force the indexing pin 72 upwardly into one of the indexing plate notches 80 as indicated in the various figures of the drawings.

Referring to FIGS. 7, 8 and 10, it will be seen that the end of the lever 86 adjacent the positioning detent 90 is provided with an angular shoulder 94 to afford a recessed surface 96. Pivotally attached in face-to-face contact with said recessed surface 96 is a swivel block 98 having a vertical face 100 and an inclined bottom face 102. A light bias spring 104 may be mounted as indicated to normally urge the vertical face 100 into abutment with the angular shoulder 94. It will thus be seen that the swivel block 98 may be rotated against the action of the bias spring 104 (counter-clockwise as viewed in FIGS. 2 and 10), but is prevented by the angular shoulder 94 from rotating in the opposite direction.

A trip block 106 is immovably mounted in the base 12 beneath the lever 86 and in the same vertical plane as the swivel block 98. The trip block 106 is provided with an inclined front face 108, and it should be noted that the angle of inclination thereof is the same as that of the inclined bottom face 102 of the swivel block 98 (approximately 30° in the embodiment illustrated). When the slide is moved into the operational work position (toward the left as viewed in the various figures of the drawings), the swivel block 98 may be rotated counter-clockwise as already described with no resultant effect on the lever 86. However, when the slide 14 is moved toward the right and away from the operational work position, it will be seen that the swivel block inclined bottom face 102 is forced to ride up on the trip block inclined face 108. As a result, the lever 86 is caused to pivot and pull the indexing pin 72 downwardly and out of engagement with the indexing plate notch 80 in which the same had previously been positioned, as indicated in the dotted showing of FIG. 10. In this condition, the indexing plate may be now rotated for further indexing as desired. Of course, as the slide 14 is moved even farther to the right, the swivel block 98 rides beyond the trip block 106 and the indexing pin 72 once again moves up into engagement with a notch 80 (the condition of FIG. 2). Similarly, the same result is achieved if the slide 14 is moved toward the operational position so that the swivel block 98 moves off of the trip block 106 toward the left. It will thus be appreciated that indexing may be achieved only when the swivel block 98 is up on the trip block 106. This is an automatic safety feature which prevents the inadvertent movement of the tool support into operational work position with no locking of the indexed position of the turret 16. In many situations, the described locking action of the indexing pin 72 within a notch 80 might be sufficient. However, under heavy work stresses, it is desirable and often necessary to have even firmer and more rigid locking action. To this end, I have provided novel automatic locking means which will now be described in detail.

Cooperating with the locking plate 56 and loosely positioned thereon is an annular cam locking ring 110. The cam locking ring 110 has an annular tapering bottom surface 112 which is opposed to and thus mates with the inclined circumferential surface 57 of the locking plate 56 (see FIGS. 2 and 4). Referring to FIGS. 5–8 inclusive, it will be noted that the top of the cam locking ring 110 is provided with four equally spaced canted surfaces 114 adjacent the circumferential edge thereof. Cooperating with said canted surfaces 114 are four cam blocks 116 which are screwed as by screws 117, or otherwise fixedly secured to the walls of the slide cavity 40 (see FIG. 4) so that each of said blocks is positioned in aligned relationship with one of said canted surfaces.

Each of the cam blocks 116 comprises a plug-like member having a vertical shoulder 118 to afford a bottom cam surface 120 which overhangs the related canted surface 114. It is most important to note that the cam surface 120 is inclined at the same angle as the canted surface 114, but in opposed relationship therewith (see FIG. 6). In the unlocked condition, the cam surface 120 is positioned over the low point of the canted surface 114 so that there is no jamming or camming action exerted on the cam locking ring 110. However, it will be appreciated that if the cam locking ring 110 is rotated slightly to the position shown in FIGS. 5 and 6, the two described opposing surfaces cause a camming action which obviously tends to force the entire locking ring 110 downwardly. As the locking ring 110 is thus forced downwardly, the tapered bottom surface 112 thereof acts upon the inclined circumferential edge 57 of the locking plate 56 to likewise force said locking plate downwardly. This downward motion is transmitted through the adjusting screw 62 with the result that the entire plate assembly heretofore described is jammed downwardly into a most secure locked condition. The radial movement of the locking ring 110 and the angle of the camming surfaces 114 and 120 need not be very great in order to achieve the described jamming action. In this regard, I have determined that an angle of inclination of 3° is ideal for the canted surfaces 114 and cam surfaces 120.

To render the entire locking action completely automatic, I have provided novel means which will now be described. Turning to FIGS. 7 and 8, the cam locking ring 110 is formed with a pair of outwardly extending ears 122 and 124 at opposite sides thereof. An activator arm 126 is reciprocably positioned in a horizontal bore formed in the wall of the slide cavity 40 (see FIG. 2). The activator arm 126 is provided with a notch 128 adjacent the inner end thereof, and said notch is adapted to accommodate the ear 122 therein as indicated.

The opposite end of the activator arm 126 projects out of the slide 14 and there is attached thereto a depending, rotatable cam roller or follower 130 (see FIGS. 1 and 9). A cam bracket 132 is rigidly secured to the base 12 in aligned relationship with the cam follower 130. The cam bracket 132 is provided with an upwardly opening slot 134 which is inclined forwardly and inwardly as indicated. The slot 134 is dimensioned and positioned to afford a directing way for the cam follower 130.

The automatic operation of the locking means may now be described as follows. With the tool support in non-operational and unlocked condition, the cam follower 130 is positioned behind or to the right of the cam bracket 132 as illustrated in FIGS. 1 and 7 of the drawings. However, when the slide 14 is moved toward the left and into operational position, the cam follower 130 automatically enters the slot 134. As the cam follower continues to ride forwardly in the slot 134, the activator arm 126 is caused to move inwardly. The motion of the activator arm 126 of course causes the locking ring 110 to rotate (counter-clockwise as seen in FIGS. 7 and 8) with the result that the previously described locking action occurs. When the slide is in the fully locked and operational work position, the cam follower 130 has moved forwardly out of the cam bracket 132 and occupies the relative position shown in FIG. 8. To unlock the tool support, it is of course merely necessary to reverse the described procedure whereupon the outward motion of the activator arm 126 rotates the locking ring 110 in the unlocking clockwise direction.

To assist in the above described locking motions and to further insure the retention of the locked condition during the stress of the work cycle, I have provided a relatively heavy, resilient spring means 136. The spring means 136 is mounted in a horizontal bore formed in the slide 14 (not shown) and the same acts upon the ear 124 to normally urge the locking ring 110 counter-clockwise or toward the locked condition. In this regard, the previously mentioned tensioning function of the adjusting screw 62 may now be appreciated. Since the screw 62 is connected to the locking plate 56, which plate in turn bears up against the locking ring 110, the screw, in cooperation with the tension springs 64, may exert any desired tension upon the complete locking means assembly. The degree of tension thus applied will of course affect the ease and amount of locking motion required to give the desired secure locking action.

Attention may now be directed to FIGS. 1-4 inclusive for a description of the tool turret 16. As already described, all of the precision and expensive indexing, bearing and locking means comprise an integral part of the base 12 and slide 14. Thus, the turret 16 comprises merely a separate and relatively inexpensive tool-holding member. In the embodiment illustrated, the turret 16 is hexagonal in configuration and has six equal faces such as 138, although obviously the turret could as well be circular. It should be noted here that the indexing plate 44 is likewise provided with six equally spaced notches 80. It will thus be readily appreciated that each of the notches 80 serves as an indexing stop for one of the faces 138.

The turret 16 is attached to the master plate 46 by the use of three tie bolts such as 140 and a precision force-fitted dowel pin 141 to further insure against any rotational "play" of the turret. The turret may have a central bore 142 to permit ready acess to the adjusting screw 62, and I have provided a circular dust cover 144 for covering said bore to prevent the entrance of dirt, shavings, and the like, into the precision means. An angularly positioned jamming screw such as 146 may be employed for firmly but removably positioning the dust cover 144 as indicated.

Since the turret 16 must be individually bored out with tool shank holes to suit the specific machine on which the same is to be used, the turret is customarily furnished in blank with no holes drilled in any of the faces 138 thereof. In general, the only marking is a vertical line on each of the faces 138 to indicate the exact horizontal center thereof. After the tool shank holes are accurately bored out, the tools may be inserted therein and locked in place with locking means provided in the turret. Heretofore, the tool shank locking means generally comprised a screw or the like positioned above the horizontal center of the face 138 and of a size adapted to securely lock only one specific size of tool shank.

In my turret 16, I employ six novel bottle-like locking studs such as 148. Each of the studs 148 has a relatively thick body portion 150 and a narrower threaded neck 152 projecting upwardly out of the turret 16. Each of the studs 148 is positioned in a suitable vertical bore 154, and it is important to note that the same is positioned just slightly off of the horizontal center line of its respective face 138. When the tool shank holes such as 156 are being bored out, it will be appreciated that the hole is likewise partially bored through the stud 148 (see FIG. 3). It will be further appreciated that due to the positioning and the relatively thick size of the stud body 150, tool shank holes of various sizes may be bored out of the stud 148 without unduly weakening the stud for its locking function. Thus, in the embodiment illustrated, tool shank holes ranging from ⅜ of an inch up to an inch may be safely employed. Small wedging screws such as 158 may be employed to hold the studs 148 in non-rotatable relationship during the boring operation. Once a tool shank has been inserted into a hole 156, the same may be securely locked in place as follows. A nut 160 is threaded on the stud neck 152. After the tool shank has been inserted, it is merely necessary to slightly tighten the nut 160 and thereby cause an upward jamming motion of the stud 148.

From the foregoing description, it should be apparent that I have provided a novel tool support containing numerous improvements and refinements not heretofore found in similar supports. The expensive apparatus may be used interchangeably on more than one similar lathe or like machine because the indexing, bearing and locking means comprise an integral part of the base and slide. It thus becomes necessary to replace and bore out only a relatively inexpensive turret, which may be readily attached to the basic slide with the assurance of precision accuracy. An added advantage of the described removable turret is the fact that when the base and slide bearing ways inevitably become worn, the resulting drop in the vertical center of the tool shank holes may be readily compensated for by merely inserting a suitably sized shim between the turret 16 and master plate 46. The useful life of each bored out turret and the entire tool support may thus be prolonged. The novel locking means are most efficient and secure, and the same function completely automatically. Similarly, the accurate indexing means are automatically retracted to permit further indexing with the away-from-operational-position-movement of the slide.

It is believed that my invention, its mode of construction and assembly, and many of its advantages should be readily understood from the foregoing without further description, and it should also be manifest that while a preferred embodiment of the invention has been shown and described for illustrative purposes, the structural details are nevertheless capable of wide variation within the purview of my invention as defined in the appended claims.

What I claim and desire to secure by Letters Patent of the United States is:

1. A tool support for attachment to a lathe or the like machine comprising a base, a slide movably mounted on said base, said slide being formed with a circular opening and communicating cavity adjacent the front end thereof, means in said slide and base for moving said slide into operational work position, tool turret indexing means comprising an annular indexing plate rotatably mounted on said slide and circumscribing said opening, said indexing plate being formed with a plurality of radially spaced indexing notches, an indexing pin reciprocably mounted in said slide beneath said indexing plate and adapted to be engaged by any of said indexing notches, and biasing means secured to said slide and normally urging said indexing pin upwardly into one of said indexing notches, tool turret mounting means comprising a circular master plate mounted on said indexing plate, said master plate having a depending annular hub rotatably mounted in said circular opening, said master plate and indexing plate being connected together so that they rotate as a single unit, locking means positioned in said slide for locking said turret mounting means in a selected indexed position, and activator means positioned in said slide and on said base for activating said locking means, said activator means being automatically operable when said slide is moved into operational work position, said locking means comprising a circular locking plate connected to said master plate and positioned in said cavity, said locking plate having an inclined circumferential edge, an annular cam locking ring loosely positioned on said locking plate, said locking ring having an inclined annular bottom surface opposed to said inclined circumferential edge, a plurality of spaced canted surfaces formed in the top surface of said locking ring adjacent the edge thereof, and a plurality of cam blocks immovably secured to the wall of said cavity each in aligned relationship with one of said canted surfaces, said cam blocks and canted surfaces cooperating to securely lock said master plate in a selected indexed position.

2. The tool support of claim 1 in which each of said cam blocks comprises a bottom cam surface which overhangs its respective canted surface, said bottom cam surface being inclined at the same angle but opposed to its respective canted surface whereby when said cam locking ring is rotated said cam and canted surfaces force said cam locking ring, locking plate and connected master plate downwardly to securely lock said master plate in a selected indexed position.

3. The tool support of claim 2 in which said cam locking ring is provided with first and second ears protruding from the edge thereof, and said activator means comprises an activator arm reciprocably positioned in a horizontal bore in the wall of said cavity, the inner end of said activator arm being formed with an activator notch, said activator notch accommodating said first ear therein, the outer end of said activator arm projecting outwardly of said slide, a rotatable cam follower depending from the outer end of said activator arm, and a cam bracket immovably secured to said base in aligned relationship with said cam follower, said cam follower and cam bracket cooperating to reciprocate said activator arm and activate said locking means by rotating said cam locking ring.

4. The tool support of claim 3 in which spring means is positioned in a horizontal bore in the wall of said cavity, said spring means bearing against said second ear and adapted to urge and maintain said cam locking ring and locking means in the locked condition.

5. The tool support of claim 1 in which said locking plate includes an internally threaded annular upstanding hub, said upstanding hub being fitted within said depending hub of said master plate, a tension-adjusting screw positioned through said depending hub and threadedly engaged by said upstanding hub, said screw including an enlarged head positioned above said master plate.

6. The tool support of claim 5 in which a plurality of holes are formed in the top surface of said master plate, a tension spring positioned in each of said holes and adapted to bear upwardly against said enlarged head of said screw, said tension springs and tension-adjusting screw cooperating to afford adjustable means for varying the tension on said locking means.

7. The tool support of claim 6 in which said tension-adjusting screw is formed with an internally threaded central bore therethrough, a locking screw engaged in said central bore for locking said tension-adjusting screw in a selected position.

8. A tool support for attachment to a lathe or the like machine comprising a base, a slide movably mounted on said base, said slide being formed with a circular opening and communicating cavity adjacent the front end thereof, means in said slide and base for moving said slide into operational work position, tool turret indexing means comprising an annular indexing plate rotatably mounted on said slide and circumscribing said opening, said indexing plate being formed with a plurality of radially spaced indexing notches, an indexing pin reciprocably mounted in said slide beneath said indexing plate and adapted to be engaged by any of said indexing notches, and biasing means secured to said slide and normally urging said indexing pin upwardly into one of said indexing notches, tool turret mounting means connected to said indexing means, locking means positioned in said slide for locking said turret mounting means in a selected indexed position, and activator means positioned in said slide and on said base for activating said locking locking means, said activator means being automatically operable when said slide is moved into operational work position, said biasing means comprising a pivotally mounted lever, a button secured to an end of said lever and engaged within a notch formed in the bottom of said indexing pin, spring means normally urging said lever so that said indexing pin is forced upwardly, a swivel block connected to the opposite end of said lever, a trip block immovably positioned beneath said lever and in aligned vertical relationship with said swivel block, said swivel block and trip block cooperating to automatically rotate said lever and retract said indexing pin out of one of said indexing notches when said slide is moved away from the operational work position.

9. In a tool support for attachment to a lathe or like machine and including a base and a slide movably mounted thereon; tool turret indexing means positioned in and secured to said slide, tool turret mounting means connected to said indexing means, a separable tool turret removably connected to said mounting means, locking means positioned in said slide for locking said tool turret in a selected indexed position, and activator means positioned in said slide and on said base for activating said locking means, said activator means being automatically operable when said slide is moved into operational work position, said locking means comprising a cam locking plate, a cam locking ring rotatably positioned on said cam locking plate, a plurality of canted surfaces on said cam locking ring, and a plurality of stationary cam blocks positioned each in alignment with one of said canted surfaces, said cam blocks and canted surfaces cooperating upon the rotation of said cam locking ring to pull said indexing means, mounting means and locking means downwardly into secure locked condition.

10. A tool support for attachment to a lathe or like machine comprising a base, a slide movably mounted on said base, means in said slide and base for longitudinally moving said slide into operational work position, said slide being formed with a circular opening and communicating cavity adjacent the front end thereof, tool turret indexing means positioned in and secured to said slide, said indexing means comprising an annular indexing plate rotatably mounted on said slide and circumscribing said opening, said indexing plate being formed with six equally spaced indexing notches opening to the periphery thereof, an indexing pin reciprocably mounted in said slide beneath said indexing plate and adapted to be engaged by any of said indexing notches, biasing means secured to said slide and normally urging said indexing pin upwardly into one of said indexing notches, means secured to said base for automatically actuating said biasing means to retract said indexing pin out of engagement wtih one of said indexing notches when said slide is moved away from the operational work position, a circular master plate mounted on said indexing plate and immovably connected thereto, said master plate having a depending annular hub rotatably mounted in said circular opening, locking means for locking said indexing plate and master plate in a selected indexed position, said locking means comprising a circular locking plate having an internally threaded upstanding hub connected to said master plate, said upstanding hub being fitted within said depending hub of said master plate, said locking plate having an inclined circumferential edge, a plurality of dowel pins keying said locking plate to said depending hub, an annular cam locking ring loosely positioned on said locking plate and having an inclined annular bottom surface opposed to said inclined circumferential edge, first and second ears projecting outwardly from said cam locking ring, four equally spaced canted surfaces formed in the top surface of said locking ring adjacent the edge thereof, four cam blocks immovably secured to the wall of said cavity each in alignment with one of said canted surfaces, each of said cam blocks having an inclined bottom cam surface of the same angle but opposed to and overhanging its respective canted surface, said cam surfaces and canted surfaces cooperating to force said cam locking ring, locking plate and master plate downwardly into a secure locked condition when said cam locking ring is rotated, a tension-adjusting screw positioned through said depending hub and threadedly engaged by said upstanding hub to afford means for varying the tension on said locking means, an activator arm reciprocably positioned in a horizontal bore in the wall of said cavity, the inner end of said activator arm being provided with an activator notch, said activator notch accommodating said first ear therein, the outer end of said activator arm projecting outwardly of said slide, a rotatable cam follower depending from the outer end of said activator arm, a cam bracket immovably secured to said base in aligned relationship with said cam follower, said cam follower and cam bracket cooperating to automatically reciprocate said activator arm and rotate said cam locking ring when said slide is moved into the operational work position, spring means positioned in a horizontal bore in the wall of said cavity, said spring means bearing against said second ear and adapted to urge and maintain said cam locking ring in the locked condition, and a separate tool turret removably connected to said master plate with a plurality of tie bolts.

11. The tool support of claim 10 in which said tool turret comprises a separate hexagonal turret having six equal blank faces, said faces adapted to be bored out to form tool shank holes, a tool shank locking stud positioned in a bore adjacent the horizontal center of each of said faces so that when a tool shank hole is bored out a corresponding portion of said stud is likewise bored out, said studs being dimensioned so that tool shank holes of varying sizes may be bored therethrough, and a locking nut cooperating with each of said studs for securely locking a tool shank in any of said tool shank holes.

12. The tool support of claim 10 in which a longitudinal channel is formed in the upper surface of said base, rectangular gibs adjustably disposed within said channel at opposite sides thereof, each of said gibs comprising a pair of elongated rectangular bars secured together in right angle relationship, longitudinal grooves formed in opposite sides of said slide, said longitudinal grooves being shaped to mate with and provide a way for said gibs.

References Cited in the file of this patent
UNITED STATES PATENTS

| | | |
|---|---|---|
| 556,415 | Hartness | Mar. 17, 1896 |
| 922,429 | Hollm | May 18, 1909 |
| 969,433 | Wigglesworth | Sept. 6, 1910 |
| 1,135,329 | Shearer | Apr. 13, 1915 |
| 1,288,351 | Wood | Dec. 17, 1918 |
| 2,481,712 | Benes | Sept. 13, 1949 |